March 6, 1945.  D. W. DOWER ET AL  2,370,620

RAILWAY TRACK CIRCUIT APPARATUS

Filed May 18, 1943

INVENTORS
David W. Dower and
Augustus W. Clark
THEIR ATTORNEY

Patented Mar. 6, 1945

2,370,620

UNITED STATES PATENT OFFICE 2,370,620

RAILWAY TRACK CIRCUIT APPARATUS

David W. Dower, Burlingame, and Augustus W. Clark, Albany, Calif., assignors to The Union Switch and Signal Company, Swissvale, Pa., a corporation of Pennsylvania Application May 18, 1943, Serial No. 487,504

4 Claims. (Cl. 246—41)

Our invention relates to railway track circuit apparatus and is more particularly directed to improving the shunting sensitivity and decreasing the power required by a railway signaling track circuit. The present invention is an improvement on the invention disclosed in our United States Patent No. 2,187,225, granted January 16, 1940, for Impulse track circuit.

One object of our invention is to provide more sensitive shunting of the track relay. Another object is to decrease the amount of track circuit current required to maintain the track relay normally energized. Other objects and advantages of the apparatus embodying our invention will become apparent from the description which follows.

We accomplish the foregoing objects by providing two auxiliary relays at the feed end of the track circuit, both of these relays remaining normally deenergized but becoming energized when a train enters the track circuit. As soon as the train vacates the track circuit, one auxiliary relay releases but the other auxiliary relay remains energized for a period of time due to its slow releasing characteristic. During the transient time interval when one relay is released but the other is still energized, a circuit is closed around the track current-limiting resistor so that the track relay receives a comparatively strong pick-up impulse. When the slow acting relay releases, the path around the resistor is opened but the track relay will now remain in its picked up condition.

We shall describe two forms of apparatus embodying our invention and shall then point out the novel features thereof in claims.

Figure 1:
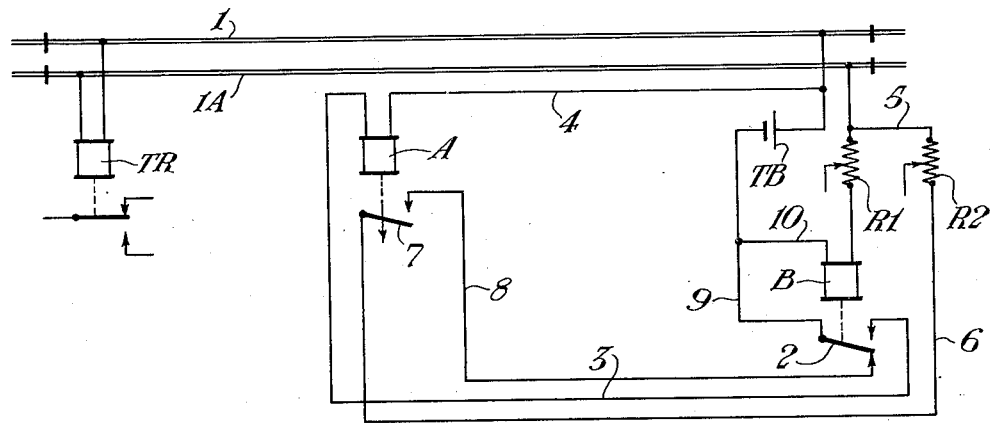
Figure 2:
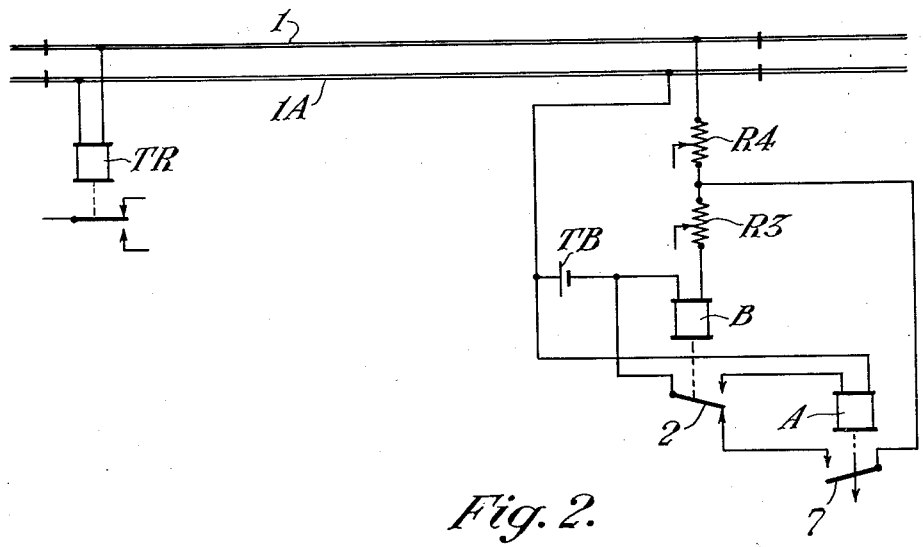

Fig. 1 of the accompanying drawing is a diagrammatic view showing one form of track circuit apparatus embodying our invention. Fig. 2 is a diagrammatic view showing a modified form of the apparatus shown in Fig. 1.

Referring to Fig. 1 of the drawing, the rails 1 and 1A of the stretch of track are divided by the usual insulated joints into a track circuit section having a suitable source of current such as a track battery TB and the usual current-limiting resistor R1 at one end of the section and a track relay TR at the other end. Associated with the battery TB are two auxiliary relays A and B and a resistor R2, relay A being of the slow release type and thus being slower to release than relay B. The latter relay may be the usual series-connected approach lighting relay and is normally deenergized, as shown. Relay A has an energizing circuit which extends from the left-hand terminal of battery TB, over the front point of contact 2 of relay B, wire 3, winding of relay A, and wire 4, to the right-hand terminal of the battery. The transiently closed circuit which connects resistor R2 around the combination of resistor R1 and winding of relay B includes wire 5, resistor R2, wire 6, front contact 7 of relay A, wire 8, back point of contact 2 of relay B, and wires 9 and 10, to the winding of relay B.

Normally, with the section unoccupied, the apparatus is in the condition shown in the drawing in which the relays A and B are both released so that the circuit through resistor R2 is open and the track relay TR is picked up. When a train enters the section and releases the track relay TR, the increased current flowing from the track battery due to the train shunt causes pick-up of the series relay B which results in the pick-up of relay A. Both relays A and B now remain picked up during occupancy, and relay TR remains released.

As soon as the train vacates the section, relay B releases, opening the energizing circuit for relay A but the latter relay will not release immediately due to its slow release characteristic. During this transient interval, the shunt path around resistor R1 and through resistor R2 is closed. The latter resistor is designed to have an ohmic value sufficiently low to permit a substantial increase in current through the track relay, whereupon this relay will pick up. The duration of the transient interval depends on the release time of relay A and must be long enough to insure pick-up of the track relay under adverse conditions of low ballast resistance and low battery voltage.

Release of relay A at the expiration of its release time opens the shunt circuit around resistor R1 so that the current through relay TR is restored to its normal or holding value. This value is sufficient to maintain the relay in its picked up condition in readiness for sensitive release when a train enters the section but is ordinarily not sufficient for pick-up without the assistance of the shunt circuit around resistor R1.

Referring now to Fig. 2, the apparatus of this figure is quite similar to that of Fig. 1 except that instead of using two resistors R1 and R2 in parallel paths for obtaining the pick-up impulse, two resistors R3 and R4 are connected in series, and a shunt path around one of these is closed during the transient interval. Following occupancy, when the track circuit becomes vacated and relay B releases, a shunt path around the winding of relay B and resistor R3 is closed over the back point of contact 2 and front point of contact 7 during the transient interval so that the remaining resistor R4 largely determines the strength of the pick-up impulse. The values of resistors R3 and R4 will ordinarily not correspond with the values of resistors R1 and R2 of Fig. 1 because in Fig. 2, the holding current of relay TR is determined by the series combination of resistors R4, R3, and winding of relay B whereas in Fig. 1, this current is determined by resistor R1 and winding of relay B. The remaining operation of the apparatus of Fig. 2 will be entirely clear from the description presented in connection with Fig. 1.

One advantage of the track circuit embodying our invention is that it not only provides increased shunting sensitivity over the usual form of track circuit but also conserves battery since the current which the battery is called upon to deliver is only the holding current, the pick-up current being supplied only during the transient interval. Also, no auxiliary source of current in addition to the usual track battery is required and the circuit is particularly well adapted for use at locations where a series approach lighting relay is already in service since no additional relay B is then required.

Although we have herein shown and described only two forms of railway track circuit apparatus embodying our invention, it is understood that various changes and modifications may be made therein within the scope of the appended claims without departing from the spirit and scope of our invention.

Having thus described our invention, what we claim is:

1. A track circuit for a section of railway track comprising, in combination, a track relay energized from the rails at one end of the track circuit; a source of track circuit current, a current-limiting element, and a normally deenergized first relay, all connected in series so as to deliver current from said source to the rails at the other end of the track circuit, said first relay becoming picked up when the track circuit is occupied; a second relay having a slow release interval longer than the release time of said first relay, an energizing circuit for said second relay including a front contact of said first relay, and a shunt path around said current-limiting element including a front contact of said second relay and a back contact of said first relay for causing a pick-up impulse of current to be supplied from said source to said track relay when the track circuit becomes unoccupied.

2. A track circuit for a section of railway track comprising, in combination, a track relay energized from the rails at one end of the track circuit; a source of track circuit current, a current-limiting element, and a winding of a normally deenergized first relay, all connected in series so as to deliver current from said source to the rails at the other end of the track circuit, said first relay becoming picked up when the track circuit is occupied; a second relay having a slow release interval longer than the release time of said first relay, an energizing circuit for said second relay including said track circuit current source and a front contact of said first relay, and a circuit path including a back contact of said first relay, a front contact of said second relay and another current limiting element to shunt the connection of said source of track circuit current to said track circuit around the winding of said first relay and said first current-limiting element to cause a pick-up impulse of current to be supplied from said source to said track relay when the track circuit becomes unoccupied.

3. A track circuit for a section of railway track comprising, in combination, a track relay connected across the rails at one end of said section, a source of track circuit current and a winding of a first relay connected in series across the rails at the other end of said section to supply a normal energizing current to said track relay, said first relay normally released and picked up when the section is occupied, a second relay having a slow release interval longer than the release interval of said first relay, an energizing circuit including said source of track circuit current and a front contact of said first relay to pick up said second relay, and a circuit path including a back contact of said first relay and a front contact of said second relay to connect said source of current across the rails of the section around said first relay winding to temporarily supply solely from said source of current a pick-up energizing current to said track relay when the section becomes unoccupied.

4. A track circuit for a section of railway track comprising, in combination, a track relay connected across the rails at one end of the section, a source of track circuit current, a winding of a first relay, a first resistor and a second resistor connected in series across the rails at the other end of the section to supply a normal energizing current to said track relay; said first relay normally released and becoming picked up when the track section is occupied, a second relay having a slow release interval longer than the release interval of said first relay, an energizing circuit including said track circuit current source and a front contact of said first relay to pick up said second relay, and a circuit path including a back contact of said first relay and a front contact of said second relay to connect said source of current to the junction terminal of said first and second resistors around the winding of said first relay and the first resistor to increase the current supplied to said track circuit to pick up said track relay when the track section becomes unoccupied.

DAVID W. DOWER.
AUGUSTUS W. CLARK.